US012079660B2

(12) United States Patent
Bahl et al.

(10) Patent No.: US 12,079,660 B2
(45) Date of Patent: Sep. 3, 2024

(54) EVOLUTIONARY MODELLING BASED NON-DISRUPTIVE SCHEDULING AND MANAGEMENT OF COMPUTATION JOBS

(71) Applicant: Cisco Technology, Inc., San Jose, CA (US)

(72) Inventors: Rohit Bahl, Kanata (CA); Stephen Williams, Stittsville (CA); Debashish Ghosh, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/229,615

(22) Filed: Aug. 2, 2023

(65) Prior Publication Data
US 2024/0045715 A1 Feb. 8, 2024

Related U.S. Application Data

(63) Continuation of application No. 17/105,422, filed on Nov. 25, 2020, now Pat. No. 11,734,062, which is a
(Continued)

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5038* (2013.01); *G06N 3/126* (2013.01);
(Continued)

(58) Field of Classification Search
None
See application file for complete search history.

(56) References Cited

U.S. PATENT DOCUMENTS 6,230,200 B1   5/2001   Forecast et al.
9,317,337 B2   4/2016   Anderson et al.
(Continued)

FOREIGN PATENT DOCUMENTS

| CN | 104035816 A | 9/2014 |
| CN | 104932938 A | 9/2015 |
| CN | 106850726 A | 6/2017 |

OTHER PUBLICATIONS

AWS Batch, "Easy and Efficient Batch Computing Capabilities—AWS", retrieved from «https://aws.amazon.com/batch/», on Dec. 6, 2018, 7 pages.
(Continued)

*Primary Examiner* — Qing Yuan Wu
(74) *Attorney, Agent, or Firm* — Lee & Hayes, P.C.

(57) ABSTRACT

Various techniques are used to schedule computing jobs for execution by a computing resource. In an example method, a schedule is generated by selecting, for a first slot in the schedule, a first computing job based on a first priority of the first computing job with respect to a first characteristic. A second computing job is selected for a second slot in the schedule based on a second priority of the second computing job with respect to a second characteristic. The second slot occurs after the first slot in the schedule, and the second characteristic is different than the first characteristic. The first characteristic or the second characteristic includes an execution frequency. The computing jobs are executed based on the schedule.

20 Claims, 10 Drawing Sheets

Related U.S. Application Data continuation of application No. 16/161,666, filed on Oct. 16, 2018, now Pat. No. 10,877,799.

(51) Int. Cl.
*G06N 3/086* (2023.01)
*G06N 3/126* (2023.01)
*G06N 3/12* (2023.01)

(52) U.S. Cl.
CPC ............ *G06F 9/4887* (2013.01); *G06N 3/086* (2013.01); *G06N 3/12* (2013.01)

(56) References Cited

U.S. PATENT DOCUMENTS

| | | |
|---|---|---|
| 9,785,472 B2 | 10/2017 | Lee et al. |
| 11,544,499 B2 | 1/2023 | Zargahi et al. |
| 2020/0117504 A1 | 4/2020 | Bahl et al. |
| 2021/0081240 A1 | 3/2021 | Bahl et al. |

OTHER PUBLICATIONS

Juniper Networks, "AppFormix", retrieved from «https://www.juniper.net/assets/fr/fr/local/pdf/datasheets/1000613-en.pdf», Apr. 2018, 5 pages.

Kaur, et al., "Heuristics Based Genetic Algorithm for Scheduling Static Tasks in Homogeneous Parallel System", International Journal of Computer Science and Security (IJCSS), vol. 4, Issue 2, Jun. 2010, pp. 183-198.

Keshanchi, et al., "An improved genetic algorithim for task scheduling in the cloud environments using the priority queues: Formal verification, simulation, and statistical testing", The Journal of Systems and Software, Jul. 2016, pp. 1-21.

Kune et al., "Genetic Algorithm based Data-aware Group Scheduling for Big Data Clouds", 2014 International Symposium on Big Data Computing, Dec. 2014, pp. 96-104.

Monnier, et al., "A Genetic Algorithm for Scheduling Tasks in a Real-Time Distributed System", Proceedings of the 24th EUROMICRO Conference, Aug. 2008, pp. 708-714.

Office Action for U.S. Appl. No. 16/161,666, mailed on Apr. 21, 2020, Bahl, "Evolutionary Modelling Based Non-Disruptive Scheduling and Management of Computation Jobs", 7 pages.

Office Action for U.S. Appl. No. 17/105,422, mailed on Jan. 17, 2023, Bahl, "Evolutionary Modelling Based Non-Disruptive Scheduling and Management of Computation Jobs", 8 pages.

Wall, Matthew, "A Genetic Algorithm for Resource-Constrained Scheduling", Massachusetts Institute of Technology, Jun. 1996, pp. 1-62.

Xu, et al., "A genetic algorithm for task scheduling on heterogeneous computing systems using multiple priority queues", Information Sciences, Feb. 2014, pp. 255-287.

FIG. 3

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| 1 | A | B | C | D | A | E | F | G | A | E | | | A | E | G | B | A | E | | | A | E | B | | A | E | | |
| 2 | G | E | | | | | | | B | | | | | | | | C | | | | | G | | | | | | |

| | 1 | 2 | 3 | 4 | 5 | 6 | 7 | 8 |
|---|---|---|---|---|---|---|---|---|
| 1 | A | B | C | D | A | E | F | G |
| 2 | G | E | | X | | Y | | |

| | 1 | 2 | 3 | 4 | 5 | 6 | 7 | 8 |
|---|---|---|---|---|---|---|---|---|
| 1 | A | B | C | D | A | E | F | G |
| 2 | G | E | | | | | | |

EVOLUTIONARY MODELLING BASED NON-DISRUPTIVE SCHEDULING AND MANAGEMENT OF COMPUTATION JOBS

CROSS-REFERENCE TO RELATED APPLICATIONS

This application is a continuation of, and claims priority to, U.S. application Ser. No. 17/105,422, filed on Nov. 25, 2020, issued as U.S. Pat. No. 11,734,062, on Aug. 22, 2023, which is continuation of U.S. application Ser. No. 16/161,666, filed on Oct. 16, 2018, issued as U.S. Pat. No. 10,877,799, on Dec. 29, 2020, each of which are fully incorporated by reference herein.

FIELD OF THE DISCLOSURE

The present disclosure relates to the technical field of managing the effective utilization of computing resources for executing computation jobs. More particularly, embodiments described herein relate to scheduling computation jobs for execution while preserving periodicity constraints associated with the computation jobs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In cloud-based computing (or simply "cloud computing") a cloud network provider provides computing services to one or more users via a group of networked elements that need not be individually addressed or managed by the users. Instead, the computing services are presented to the users as an amorphous cloud, and the cloud provider manages an underlying suite of hardware and software computing resources to execute computation jobs in support of requested computing services.

Batch jobs and online jobs are two general categories of computation jobs. A batch job is a type of job that is executed or run periodically, for instance, a daily disk cleanup job. An online job may be executed on-demand in response to a user interaction, for instance, data processing in response to a user accessing their bank account funds at an ATM. As such, batch jobs are generally more predictable than online jobs, and allow the cloud provider to schedule the performance of the computation jobs in advance. This scheduling or delegation of computing resources to execute computation jobs is generally facilitated by some algorithmic enablement of an orchestrator tasked with determining job to server mapping. In the cloud computing context, the servers requisitioned generally belong to a large pool or some virtualized server farm. In enterprises, this scenario is characterized by a very large number of computation jobs executing on this very large cloud infrastructure.

A schedule for executing batch jobs may simply assign one or more batch jobs for execution by one or more dedicated servers. Using dedicated servers can help to ensure that computing resources are available to execute the batch jobs. However, such an approach may also result in a large pool of computing resources being horded to run a likewise large number of computation jobs. Accordingly, there is a desire to generate more optimal schedules that utilize computing resources efficiently, which can reduce associated costs and free computing resources for other tasks.

Other challenges in scheduling computation jobs are encountered when modifications are requested, such as changes to periodicity and/or frequency of computation jobs, variations in execution durations of computation jobs, adding and/or removing computation jobs, and the like. More particularly, such challenges include the failure to reserve computing resource to execute jobs that are assigned lower scheduling priorities (starvation of computation jobs), violating periodicity constraints controlling computation jobs, and generating and selecting a new schedule for execution within a finite time. Regarding the timing issue, generating and analyzing potential schedules to select a particular schedule to implement is classified as a computationally NP-hard problem. In other words, available computing resources may not be able to generate and identify an "optimal" or desirable schedule within the finite, available time before a new schedule needs to be implemented. Accordingly, there is a desire to generate effective schedules within a finite time while helping to ensure that necessary computer resources are reserved for each computation job (avoiding starvation) and maintaining periodicity of computation jobs.

BRIEF DESCRIPTION OF THE DRAWINGS

The embodiments of the disclosure will be understood and appreciated more fully from the following detailed description, taken in conjunction with the drawings in which:

FIG. 3 illustrates an example present schedule for executing computation jobs;

FIG. 4 illustrates an example past interval of computation jobs that have been executed;

FIG. 5 illustrates an example of a filtered interval of executed computation jobs;

FIG. 8A and FIG. 8B illustrate an example operation of generating a schedule based on a resulting ordered arrangement;

FIG. 9 illustrates another example operation of generating a schedule based on a resulting ordered arrangement;

DETAILED DESCRIPTION

Figure 1:
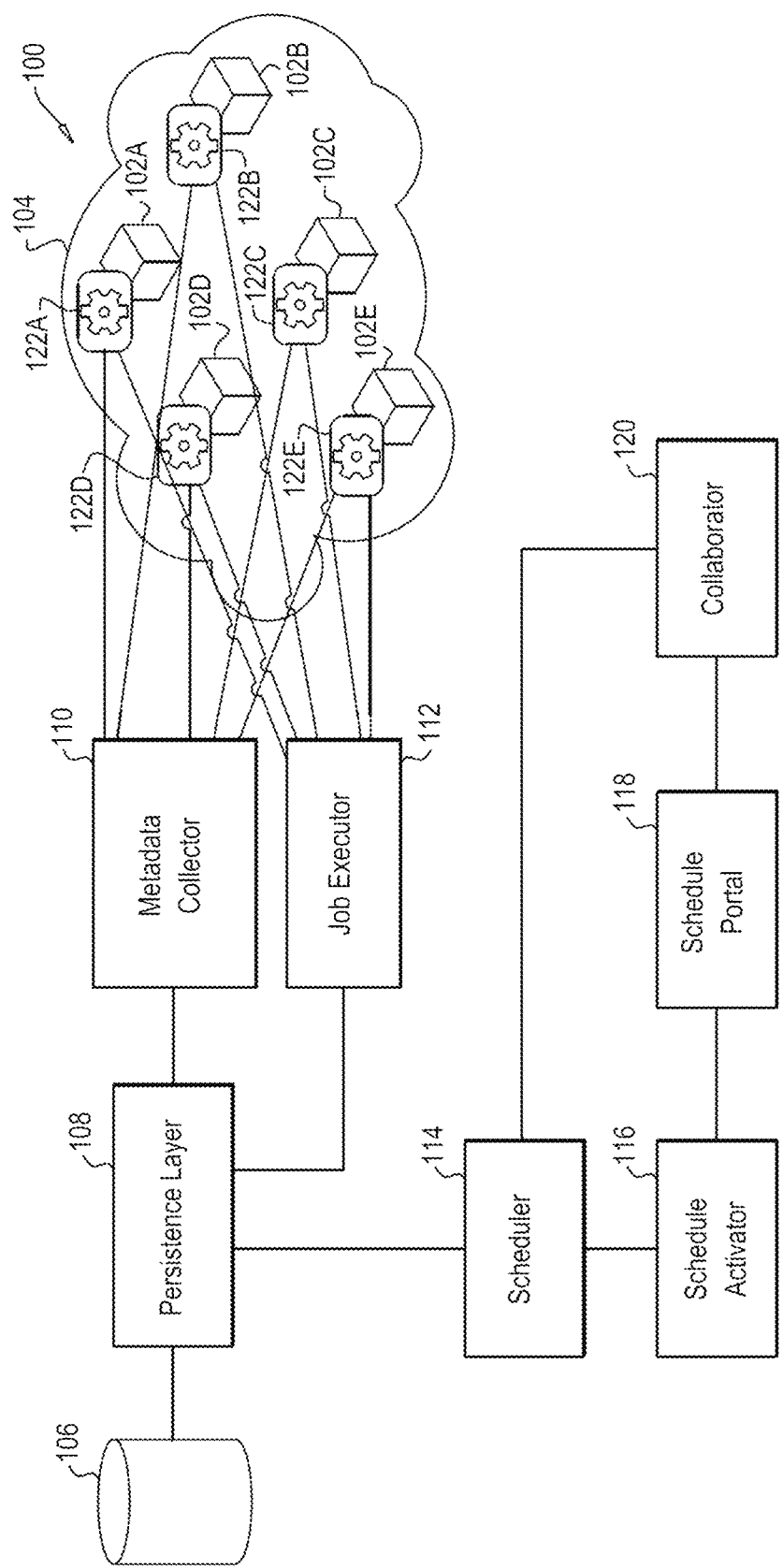
FIG. 1 is a block diagram of a computer system according an embodiment.

In the following description, for the purposes of explanation, numerous specific details are set forth in order to provide a thorough understanding of the present embodiments. It will be apparent, however, that the present embodiments may be practiced without these specific details. In other instances, well-known structures and devices are shown in block diagram form in order to avoid unnecessarily obscuring the present embodiments. Further, aspects of the disclosed embodiments can be arranged and combined in a variety of different configurations, all of which are contemplated by the present disclosure. For illustration purposes, some features and functions are described with respect to a cloud computing context. However, the features and functions disclosed herein may also be applicable to other types of computing contexts as well.

General Overview

The present disclosure helps to address the challenge of how to generate, in a finite time, a more optimal schedule for executing computation jobs and while preserving periodicity constraints associated with the computation jobs.

In an embodiment, one or more non-transitory computer-readable storage media store one or more sequences of instructions, which when executed using one or more processors causes the one or more processors to perform various functions, such as accessing data stored in memory regarding a plurality of computation jobs. Such data includes, for instance, periodicity constraints that specify execution frequencies for the plurality of computation jobs, categorization data that categorizes the plurality of computation jobs into a plurality of job types, and organization data that organizes the plurality of computation jobs into a plurality of ordered arrangements. In this embodiment, there are at least a first ordered arrangement and a second ordered arrangement, each ordered arrangement comprises references to each of the plurality of computation jobs according to job type, and the job types are associated with relative priority indicia. The functions performed by the one or more processors also include populating a resulting ordered arrangement by selecting priority indicia from between respective job types in the first ordered arrangement and second ordered arrangement, and generating a schedule for execution of the plurality of computation jobs in accordance with the relative priority indicia in the resulting ordered arrangement and the periodicity constraints. The one or more processors are also configured to execute the one or more sequences of instructions to cause execution of the plurality of computation jobs according to the schedule.

In another embodiment, a computer-implemented method includes accessing data stored in memory regarding a plurality of computation jobs. Such data includes, for instance, periodicity constraints that specify execution frequencies for the plurality of computation jobs, categorization data that categorizes the plurality of computation jobs into a plurality of job types, and organization data that organizes the plurality of computation jobs into a plurality of ordered arrangements. In this embodiment, there are at least a first ordered arrangement and a second ordered arrangement, each ordered arrangement comprises references to each of the plurality of computation jobs according to job type, and the job types are associated with relative priority indicia. The method also includes populating a resulting ordered arrangement by selecting priority indicia from between respective job types in the first ordered arrangement and second ordered arrangement, and generating a schedule for execution of the plurality of computation jobs in accordance with the relative priority indicia in the resulting ordered arrangement and the periodicity constraints. The method also includes causing execution of the plurality of computation jobs according to the schedule. One or more of these processes is performed using one or more computing devices.

In a further embodiment, a computer system includes one or more processors, a first memory coupled to the one or more processors, and a second memory coupled to the one or more processors. The first memory stores data for a plurality of computation jobs, for instance, periodicity constraints that specify execution frequencies for the plurality of computation jobs, categorization data that categorizes the plurality of computation jobs into a plurality of job types, and organization data that organizes the plurality of computation jobs into a plurality of ordered arrangements. In this embodiment, the data includes at least a first ordered arrangement and a second ordered arrangement, each ordered arrangement includes references to each of the plurality of computation jobs according to job type, and the job types are associated with relative priority indicia. The second memory stores one or more sequences of stored program instructions which when executed using the one or more processors cause the one or more processors to access the data regarding the plurality of computation jobs, populate a resulting ordered arrangement by selecting priority indicia from between respective job types in the first ordered arrangement and the second ordered arrangement, and generate a schedule for execution of the plurality of computation jobs in accordance with the relative priority indicia in the resulting ordered arrangement and the periodicity constraints. The one or more processors are also configured to execute the one or more sequences of program instructions to cause execution of the plurality of computation jobs according to the schedule.

System Overview

FIG. 1 is a block diagram of a computer system according to an embodiment. FIG. 1 illustrates a computer system 100 that is programmed or configured to schedule and execute computation jobs.

In an embodiment, computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" or similar term herein may mean one or more computers, unless expressly stated otherwise.

In the illustrated example, the computer system 100 includes computing resources 102A, 102B, 102C, 102D, 102E, which in the present embodiment are arrayed as cloud nodes in cloud network 104. The system 100 further includes data store 106, persistence layer 108, metadata collector 110, job executor 112, scheduler 114, schedule activator 116, schedule portal 118, and collaborator 120. FIG. 1 depicts one of many possible arrangements of components configured to execute the programming and functions described herein. Other arrangements may include fewer or different components, and the division of work between the components may vary depending on the arrangement.

Data store 106 stores data regarding any number of computation jobs, and may be implemented using suitable memory for storing software and/or operational data, such as an optical storage medium, a magnetic storage medium, an electronic storage medium, and/or a combination thereof. The stored data includes, for instance, periodicity constraints that specify execution periods and/or execution frequencies for the plurality of computation jobs. Illustratively, a computation job may be characterized by an execution frequency of seven times a week, and an execution period of twenty-four hours separating each execution. In this instance, the execution period is a regular, equal interval. The execution period, however, may specify varying and/or different intervals. For example, a computation job may be characterized by an execution frequency of fourteen times a week (two executions per day), and a repeating execution period of eight hours between a first execution and a second execution, and sixteen hours between the second section and a third execution.

The stored data also includes categorization data that categorizes the computation jobs as associated job types. The system 100 categorizes the computation jobs according to job types based on one or more common characteristics. Such characteristics include, for example, periodicity constraints, execution duration, utilized data and/or other utilized computing resources, functions performed, and associated user/client. The system 100 may receive such characteristic information from a user when the user requests or modifies a computation job. The system 100 may also determine some of the characteristic information by analyzing and monitoring the computation jobs prior to, during, and/or after execution. Accordingly, the system 100 may modify the categorization data with or without user input. Example job types may include, for instance, disk cleanup processing for different enterprises, statistical data processing for medical research, market data processing for investment analysis, human resource planning (e.g., processing mail orders), processing environmental information for use by autonomous vehicles, and analyzing weather data.

Further, the stored data includes organization data that organizes the computation jobs as ordered arrangements. An ordered arrangement comprising references to the plurality of computation jobs according to job type, and associates the job types with unique priority indicia. The priority indicia specify relative scheduling priority or order of selection for scheduling based on characteristics of the computation jobs/job types. Examples of these characteristics include frequency of execution, duration of job execution, computing resources utilized, among others.

In one embodiment, computation jobs are categorized into seven different job types (job types A, B, C, D, E, F, and G), and the organization data organizes the computation jobs by job type in a number of different ordered arrangements with different associated priority indicia. For example, a first ordered arrangement assigns priority indicia to the job types based on execution frequency (A=1, B=2, C=3, D=4, E=5, F=6, and G=7) and a second ordered arrangement assigns priority indicia to the job types based on execution duration (A=4, B=3, C=2, D=1, E=7, F=6, and G=5). In this example, the first ordered arrangement assigns priority indicia based on decreasing order of frequency, which specifies that computation jobs of type A should be scheduled or sequenced first since A=1, as these jobs have the highest frequency of execution and thus perhaps the highest demand to be performed. According to the first ordered arrangement, jobs of type B have fewer instances of execution than jobs of type A, and so forth with jobs of type G having the fewest instances of execution. The second ordered arrangement in this example assigns priority indicia based on decreasing duration of execution, which specifies that computation jobs of type D should be scheduled first since D=1, as these jobs have the longest execution duration. According to the second ordered arrangement, jobs of type C should be scheduled after jobs of type D followed by jobs of type B, jobs of type A, and so forth with jobs of type F scheduled last. Other examples of ordered arrangements are also possible, such as an ordered arrangement based on flexibility or allowed deviation in periodicity constraints.

Referring back to system 100 of FIG. 1, in an embodiment, persistence layer 108 functions as an interface between data store 106 and other components of system 100. For example, metadata collector 110 may provide aggregated job execution metadata for storage in data store 106 via persistence layer 108. The aggregated job execution metadata is metadata generated for, during, and/or after execution of a job or group of jobs on one or more of computing resources 102, such as start/end times, completion status, type of job, and the like. Examples of job type including online or batch. Metadata collector 110 may be configured to receive the job execution metadata from computing resources 102. The job execution metadata may be pushed to metadata collector 110 by optimization agents 122A, 122B, 122C, 122D, 122E, each of which may be provisioned on one of computing resources 102.

Optimization agents 122 are configured to provide monitoring and performance measurement of jobs scheduled to run on computing resources 102, thereby deriving the job execution metadata associated with the jobs. Optimization agents 122 may also and control the execution of jobs on computing resources 102 as per job details received from job executor 112. Optimization agents 122 may also offer computation power on behalf the computing resources 102. As such, optimization agents 122, may also be programmed to report on the capacity of the underlying hardware of computing resources 102 and how much of the capacity is being utilized. For example, optimization agent 122A may detect that computing resource 102A may be configured with 512 GB RAM, of which only 64 GB is presently being utilized. Optimization agent 122A may then include an indication of the availability of the excess capacity associated with computing resource 102A in the job performance metadata provided to metadata collector 110.

Job executor 112 is configured to provide job details and associated schedules for execution by computing resources 102. Job executor 112 may be updated from persistence layer 108 regarding jobs authorized for execution.

Scheduler 114 is configured to access data in memory, such as data store 106, and to generate potential job execution schedules using such data as the periodicity constraints, categorization data, and organization data. Scheduler 114 according to one embodiment is also configured to evaluate potential schedules and select one or more schedules to formalize and implement to execute computation jobs.

Schedule portal 118 is implemented as an interactive user interface for presenting recommendations from scheduler 114 for review, modification, and/or approval by a user. Schedule activator 116 may receive schedule recommendations from scheduler 114 and formalize/finalize the schedule(s) for presentation by schedule portal 118. Upon approval of the recommendations via schedule portal 118, schedule activator 116 may notify scheduler 114, which may then provide details of the approved recommendations to persistence layer 108. Collaborator 120 is configured to provide feedback from schedule portal 118 to scheduler 114, providing input to help optimize schedules.

Computation Job Scheduling

Figure 2:
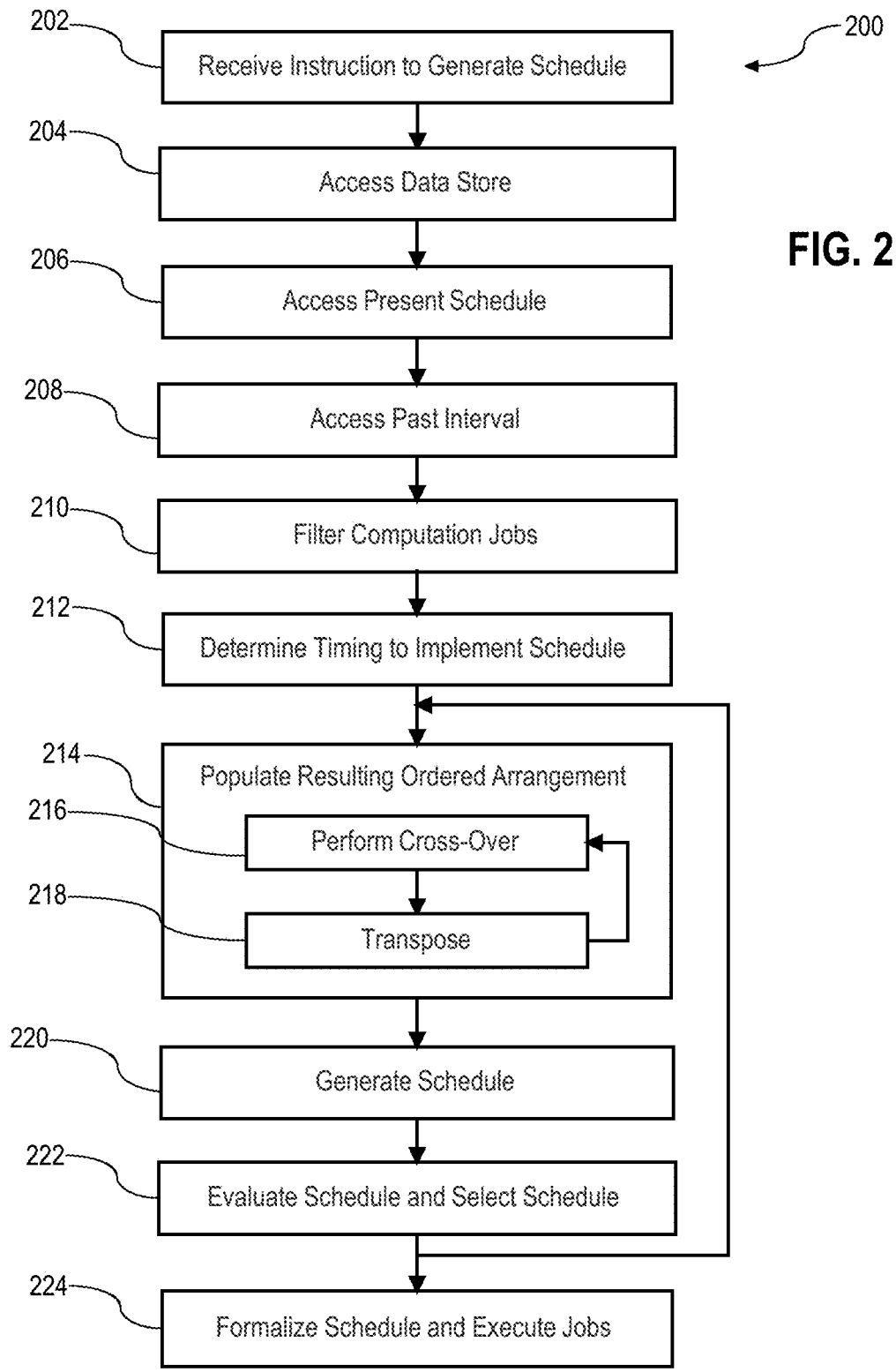
FIG. 2 is a flowchart of functions and processes performed according to an embodiment.

FIG. 2 is a flowchart of functions and processes performed according to an embodiment. For one embodiment, FIG. 2 illustrates an example method for generating and implementing schedules for executing computation jobs.

System 100 can be used to implement method 200, which includes operations, functions, and/or actions as illustrated by blocks 202-224 of FIG. 2. For purposes of illustrating a clear example, the method of FIG. 2 is described herein with reference to execution using certain elements of FIG. 1; however, FIG. 2 may be implemented in other embodiments using computing devices, programs or other computing elements different than those of FIG. 1. Further, although blocks 202-224 are illustrated in order, the blocks may also be performed in parallel, and/or in a different order than described herein. Method 200 may also include additional or fewer blocks, as needed or desired. For example, blocks 202-224 can be combined into fewer blocks, divided into additional blocks, and/or removed based upon a desired implementation.

FIG. 2 may be implemented using one or more computer programs or other software elements organized as sequences of instructions stored on computer-readable storage media. FIG. 2, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2; the development, deployment, testing and debugging of functional programs is deemed to be within the high level of skill in the art to which this disclosure pertains.

In addition, each block 202-224 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 202-224 may represent circuitry that is configured to perform the logical functions and operations of method 200.

At block 202, scheduler 114 receives an instruction to generate or modify a computation job schedule. The instruction can be received from a user, for example, via schedule portal 118. A user-provided instruction can take the form of a request to add or remove a computation job, and/or to modify an existing computation job. Example modifications that may trigger an instruction to modify a job schedule include changing periodicity constraints associated with one or more computation jobs, and other modifications that cause changes to utilized computing resources and/or execution durations.

System 100 may also generate the instruction without separate user input. In an example of such an embodiment, scheduler 114 monitors the execution of computation jobs using information from metadata collector 110 and received through persistence layer 108. By monitoring the execution of computation jobs, scheduler 114 is configured to detect a deviation in the execution of the computation jobs from an implemented schedule for execution of the jobs. The detected deviation may take the form of an added computation job, a removed computation job, and/or a modification of an existing computation job. Example modifications that may trigger an instruction to modify a job schedule include altered periodicity constraints associated with one or more computation jobs, and other changes to utilized computing resources and/or execution durations.

At block 204, scheduler 114 accesses data in data store 106. Such accessed data includes, for instance, periodicity constraints that specify execution frequencies for relevant computation jobs, categorization data that categorizes the computation jobs into a plurality of job types, organization data that organizes the computation jobs into a number of ordered arrangements, as well as, relevant modification data from the instruction received at block 202.

At blocks 206 and 208, scheduler 114 accesses data in the data store 106 including a present schedule that is being implemented to execute computation jobs, and a past interval that includes computation jobs that have recently been executed, respectively. The past interval can include a suitable time period, such as a period that includes at least one most recent execution of each computation job that is to be included in the schedule requested at block 202. Blocks 206 and 208 are illustrated as separate blocks from block 204, but can be combined with block 204 or even removed in some implementations.

FIG. 3 illustrates an example present schedule for executing computation jobs. For one embodiment, FIG. 3 illustrates an example of a present schedule 300 stored in data store 106, and accessed at block 206. Schedule 300 maps job types A-G for execution by computing resources 1 or 2 (row 1 and row 2, respectively) over the course of a seven-day period. The seven-day or week-long period is further divided into twenty-eight time segments (columns 1-28), each segment amounting to six hours. In this example, job A is executed seven times a week, job B is executed four times a week, job C is executed twice a week, job D is executed once a week, job E is executed seven times a week, job F is executed once a week, and job G is executed four times a week.

FIG. 4 illustrates an example past interval of executed computation jobs. For one embodiment, FIG. 4 illustrates an example of a past interval 400 of computation jobs that have already been executed. Past interval 400 corresponds to completed time segments 1-8 of schedule 300, and also includes computation jobs X and Y that were not part of schedule 300.

The method 200 also includes block 210, at which scheduler 114 further transforms the accessed data, for instance by filtering the computation jobs executed during the past interval (block 208) to those that were included in the present schedule (block 206). This filtering helps to exclude random on-demand jobs that were executed within the past interval, but that will not constitute part of the new schedule requested at block 202. Scheduler 114 may further filter the computation jobs to include new computation jobs that are to be included in the schedule, and to remove previously existing jobs that are now to be excluded from the schedule.

FIG. 5 illustrates an example of a filtered interval of computation jobs that have been executed. In this example, filtered interval 500 is similar to interval 400 of FIG. 4, but with on-demand jobs X and Y removed.

At block 212, scheduler 114 determines a timing to implement a new or modified schedule. Block 212 is illustrated after blocks 204-208, but may be performed concurrently with or before such blocks. Indeed, blocks 202-214 can be performed in a different order from FIG. 2 without departing from the spirit of the present disclosure.

Generally, scheduler 114 characterizes the schedule for execution of the computation jobs by a plurality of time segments, and generates the schedule by assigning or mapping the computation jobs to one or more time segments for execution by one or more computing resources. Scheduler 114 maps batch computation jobs to one or more time segments for execution in accordance with associated periodicity constraints. Illustratively, a schedule maps computation jobs to computing resources for execution over the course of a week, and the weekly timeframe is divided into time segments, such as daily time segments, quarter-day time segments (6 hours), or hourly time segments. The schedule assigns each computation job to be executed by a computing resource during one or more time segments.

At block 212, scheduler 114 determines a finite timing to implement the new or modified schedule, which for instance may amount to a next full time segment. In such an example, scheduler 114 receives an instruction to generate a schedule during a first time segment. The instruction may be triggered by a requested change to one or more of the computation jobs. In response, scheduler 114 identifies a second time segment immediately following the first time segment. During the identified second time segment, scheduler 114 performs functions such as the operations of blocks 214-222 to generate potential schedules and selects a particular schedule for implementation, such that the selected schedule can be implemented as represented by block 224 at the conclusion of the second time segment. If additional time is allowed to perform the functions of blocks 214-222, then scheduler 114 can perform additional iterations of blocks 214-222 to help select an even more optimal schedule for execution.

At block 214, scheduler 114 transforms organization data in data store 106 to populate or create resulting ordered arrangements. In the present embodiment, scheduler 114 performs functions represented by blocks 216-218 to populate resulting ordered arrangements.

At block 216, scheduler 114 performs a cross-over operation by selecting priority indicia from between respective job types in ordered arrangements of computation jobs to be included in the schedule.

At block 218, scheduler 114, responsive to selecting a priority indicium at block 216, transposes an unselected priority indicium from the given job type with another priority indicium of a subsequent job type, wherein the other priority indicium of the subsequent job type corresponds to the selected priority indicium for the given job type. Scheduler 114 iteratively performs the cross-over and transposition operations to populate resulting ordered arrangements with priority indicia for each of the computation jobs to be included in the schedule. The transpose or mutation operation disclosed herein helps to reduce the need for further iterations or otherwise reduces arbitration, because using these techniques makes it increasingly more likely that selections of priority indicia for subsequent job types does not result in different resulting ordered arrangements.

Figure 6:
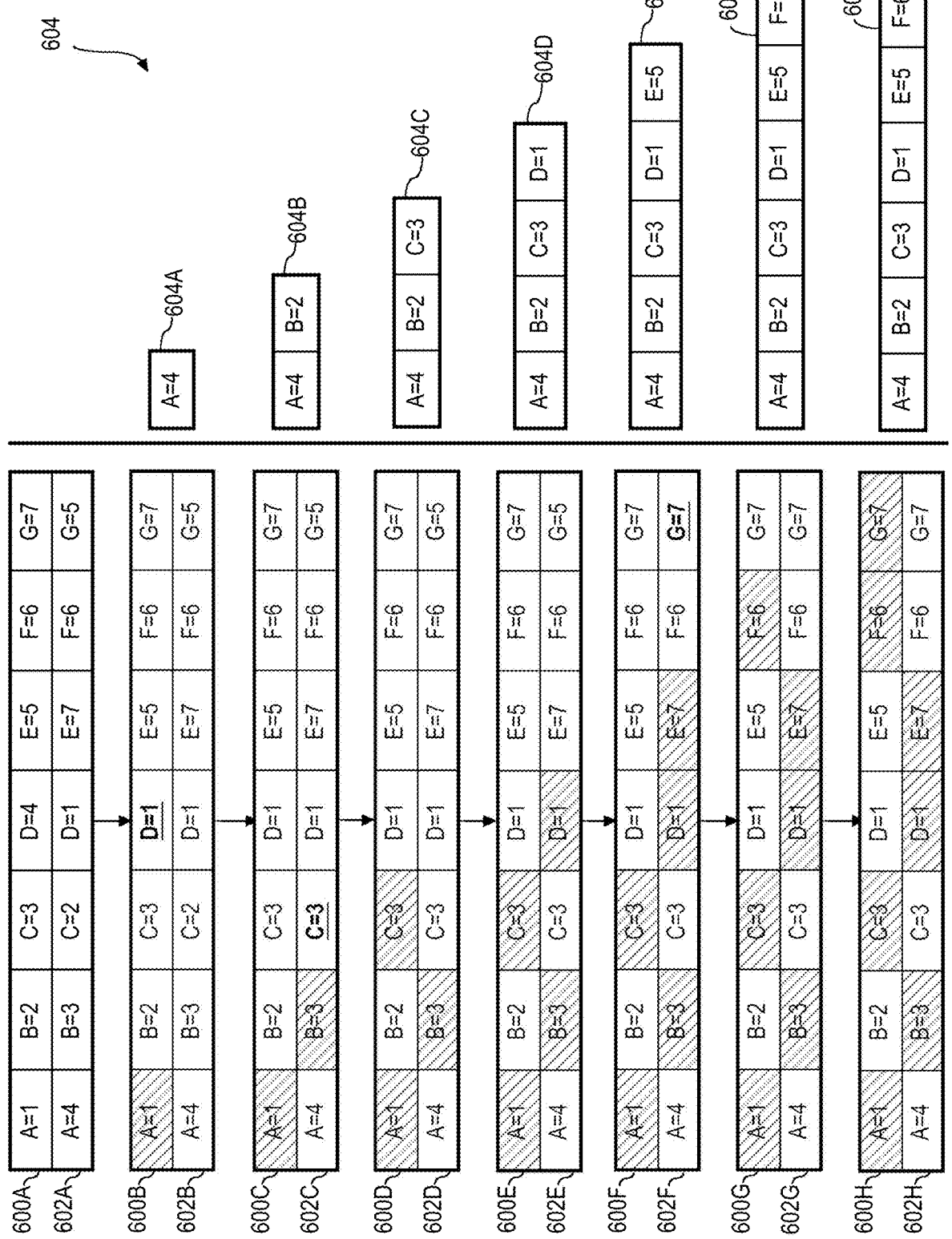
FIG. 6 illustrates an example operation of populating a resulting ordered arrangement.
Figure 7:
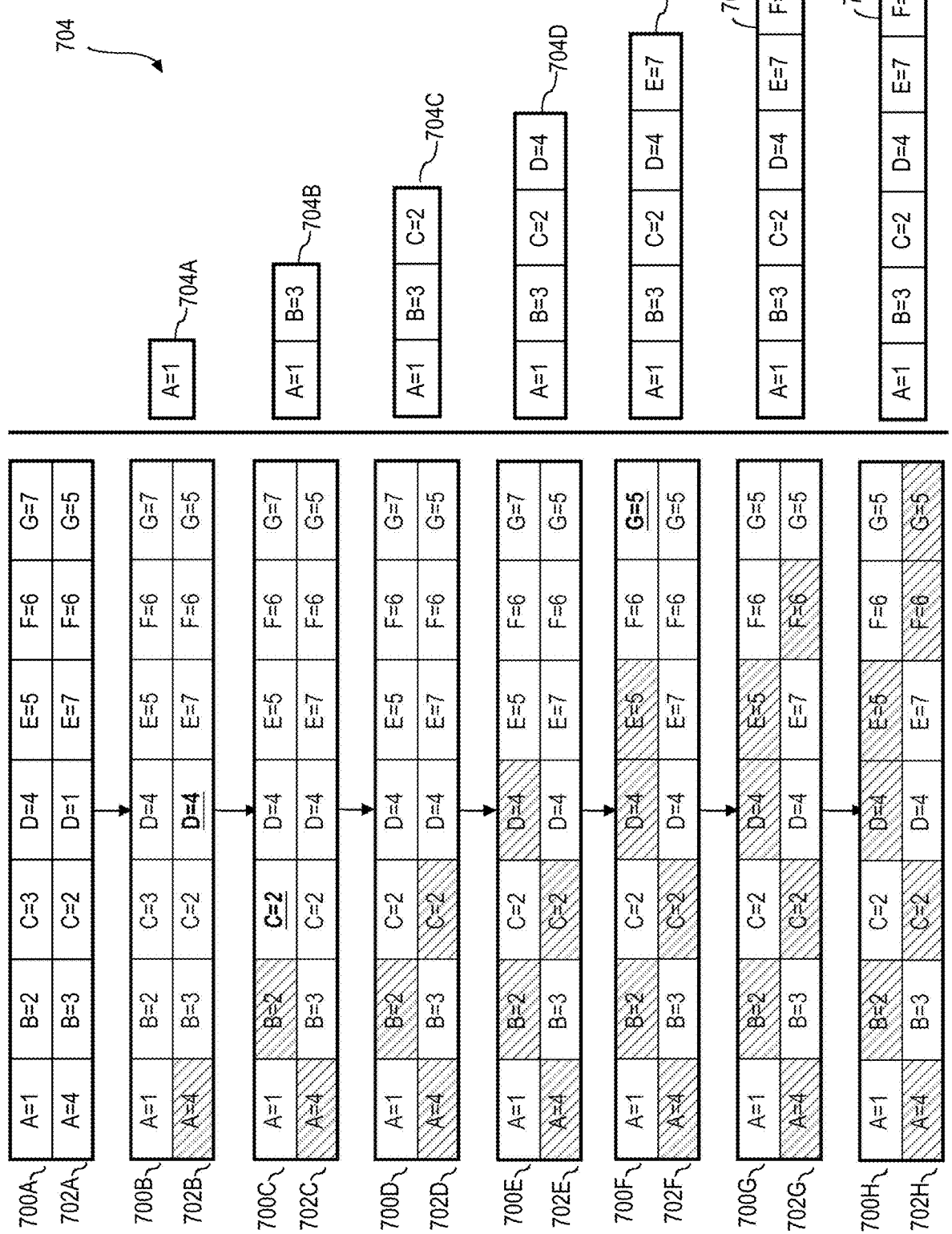
FIG. 7 illustrates another example operation of populating a resulting ordered arrangement.

FIG. 6 and FIG. 7 illustrate embodiments of the processes performed at blocks 214, 216, 218. FIG. 6 illustrates an example operation of populating a resulting ordered arrangement, and FIG. 7 illustrates another example operation of populating a resulting ordered arrangement. Referring first to FIG. 6, row 600A represents a first ordered arrangement that assigns priority indicia to computation job types A-G based on a first characteristic, for example, execution frequency. Row 602A represents a second ordered arrangement that assigns priority indicia to computation job types A-G based on a second characteristic different than the first, for example, execution duration. According to the priority indicia in the present embodiment, in which there are seven job types A-G, a value of 1 corresponds to the highest priority with decreasing priority to a value of 7, which corresponds to the lowest relative priority. In the first ordered arrangement 600A the priority indicia are assigned as A=1, B=2, C=3, D=4, E=5, F=6, and G=7. In the second ordered arrangement 602A, the priority indicia are assigned as D=1, C=2, B=3, A=4, G=5, F=6, and F=7.

FIG. 6 depicts the data ordered by job type to facilitate understanding of the cross-over and transpose operations, which are performed iteratively by job type to generate a resulting ordered arrangement 604. At a first iteration, scheduler 114 performs the cross-over operation by selecting a priority indicium for job type A between first ordered arrangement 600A and second ordered arrangement 602A. In the example of FIG. 6, scheduler 114 selects the priority indicium A=4 from second ordered arrangement 602A, and this selected priority indicium is used to populate resulting ordered arrangement 604A.

Scheduler 114 performs the transpose operation in response to the selection of the priority indicium by scanning subsequent job types for a priority indicium (4) that corresponds to the selected priority indicium (A=4). More particularly, scheduler 114 scans just the ordered arrangement that corresponds to the unselected priority indicium, which in this case is the first ordered arrangement 600A. Scheduler 114 identifies that in the first ordered arrangement 600A, job type D is assigned priority indicium 4. Scheduler 114 identifies the unselected priority indicium (A=1), and transposes or replaces the priority indicium of job type D with the unselected priority indicium, which thereby creates a new first ordered arrangement 600B with job type D being assigned a priority indicium of 1. The priority indicia in the second ordered arrangement 602B remains the same in this iteration.

At a second iteration, scheduler 114 selects a priority indicium for job type B between first ordered arrangement 600B and second ordered arrangement 602B. In the example of FIG. 6, scheduler 114 selects the priority indicia B=2 from first ordered arrangement 600B, and this selected priority indicium is used to populate a resulting ordered arrangement 604B. Scheduler 114 performs the transpose operation by scanning subsequent job types for a priority indicium (2) that corresponds to the selected priority indicium (B=2). Scheduler 114 identifies that in the second ordered arrangement 602B, job type C is assigned priority indicium 2. Scheduler 114 identifies the unselected priority indicium (B=3), and transposes or replaces the priority indicium of job type C with the unselected priority indicium, which thereby creates a new second ordered arrangement 602C with job type C being assigned a priority indicium of 3. The priority indicia in first ordered arrangement 600C are carried over from the first iteration.

At a third iteration, scheduler 114 selects a priority indicium for job type C between first ordered arrangement 600C and second ordered arrangement 602C. In the example of FIG. 6, scheduler 114 selects the priority indicia C=3 from second ordered arrangement 602C, and this selected priority indicium is used to populate a resulting ordered arrangement 604C. Scheduler 114 performs the transpose operation by scanning subsequent job types for a priority indicium (3) that corresponds to the selected priority indicium (C=3). Scheduler 114 identifies there is no subsequent matching priority indicium in first ordered arrangement 600C. The priority indicia in first ordered arrangement 600C and second ordered arrangement 602C are carried over into new corresponding ordered arrangements 600D, 602D.

At a fourth iteration, scheduler 114 selects a priority indicium for job type D between first ordered arrangement 600D and second ordered arrangement 602D. In the example of FIG. 6, scheduler 114 selects the priority indicia D=1 from first ordered arrangement 600D, and this selected priority indicium is used to populate a resulting ordered arrangement 604D. Scheduler 114 performs the transpose operation by scanning subsequent job types for a priority indicium (1) that corresponds to the selected priority indicium (D=1). Scheduler 114 identifies that there is no subsequent matching priority indicium in second ordered arrangement 602D. The priority indicia in first ordered arrangement 600D and second ordered arrangement 602D are carried over into new corresponding ordered arrangements 600E, 602E.

At a fifth iteration, scheduler 114 selects a priority indicium for job type E between first ordered arrangement 600E and second ordered arrangement 602E. In the example of FIG. 6, scheduler 114 selects the priority indicia E=5 from first ordered arrangement 600E, and this selected priority indicium is used to populate a resulting ordered arrangement 604E. Scheduler 114 performs the transpose operation by scanning subsequent job types for a priority indicium (5) that corresponds to the selected priority indicium (E=5). Scheduler 114 identifies that in second ordered arrangement 602E, job type G is assigned priority indicium 5. Scheduler 114 identifies the unselected priority indicium (E=7), and transposes or replaces the priority indicium of job type G with the unselected priority indicium, which thereby creates a new second ordered arrangement 602F with job type G being assigned a priority indicium of 7. The priority indicia in first ordered arrangement 600F are carried over from the last iteration.

At a sixth iteration, scheduler 114 selects a priority indicium for job type F between first ordered arrangement 600F and second ordered arrangement 602F. In the example of FIG. 6, scheduler 114 selects the priority indicia F=6 from second ordered arrangement 602F, and this selected priority indicium is used to populate a resulting ordered arrangement 604F. Scheduler 114 performs the transpose operation by scanning subsequent job types for a priority indicium (6) that corresponds to the selected priority indicium (F=6). Scheduler 114 identifies that there is no subsequent matching priority indicium in first ordered arrangement 600F. The priority indicia in first ordered arrangement 600F and second ordered arrangement 602F are carried over into new corresponding ordered arrangements 600G, 602G.

At a seventh iteration, scheduler 114 selects a priority indicium for job type G between first ordered arrangement 600G and second ordered arrangement 602G. In the example of FIG. 6, scheduler 114 selects the priority indicia G=7 from second ordered arrangement 602G, and this selected priority indicium is used to populate a resulting ordered arrangement 604G. Scheduler 114 has now performed the cross-over and transpose operations for each of the job types in the ordered arrangements, and the resulting ordered arrangement 604G assigns the following priority indicia A=4, B=2, C=3, D=1, E=5, F=6, and G=7. First and second ordered arrangements 600H, 602H, respectively, are shown for completeness but are not further utilized in the present example.

Referring to FIG. 7, a first ordered arrangement 700A and a second ordered arrangement 702B are identical to ordered arrangements 600A and 602A, respectively. In the example of FIG. 7, scheduler 114 performs iterations of the cross-over and transpose operations on these ordered arrangements by selecting opposing priority indicium as compared to the example of FIG. 6. The resulting ordered arrangement 704G assigns the following priority indicia A=1, B=3, C=2, D=4, E=7, F=6, and G=5. In method 200, scheduler 114 performs various iterations of block 214-218 to generate additional ordered arrangements by selecting different combinations of priority indicia from between different ordered arrangements.

At block 220, scheduler 114 uses a resulting ordered arrangement, and other data in data store 106, to generate a new or modified job execution schedule. At block 222, scheduler 114 evaluates a generated schedule and selects or updates a selection of a schedule. At block 224, scheduler 114 formalizes the selected schedule to cause execution of associated computation jobs.

In one example, job executor 112 was causing execution of computation jobs according to a first schedule, such as schedule 300 in FIG. 3. During time segment 8 of schedule 300, scheduler 114 receives an instruction to modify the job schedule based on new periodicity constraints for job types A-G. The new periodicity constraints specify that job A is executed two times a week, job B is executed seven times a week, job C is executed twice a week, job D is executed four times a week, job E is executed four times a week, job F is executed once a week, and job G is executed seven times a week. In response to receiving the instruction, scheduler accesses data including present schedule 300, past interval 400 of FIG. 4, and filtered interval 500 of FIG. 5. The request was received during time segment 8, and job executor 112 continues to cause execution of the computation jobs according to the next time segment 9 of present schedule 300. During the time segment 9, scheduler 114 iteratively populates resulting ordered arrangements (blocks 214-218), generates new schedules (block 220), and evaluates the schedules to identify and select a particular schedule for implementation (block 222).

Figure 8A:
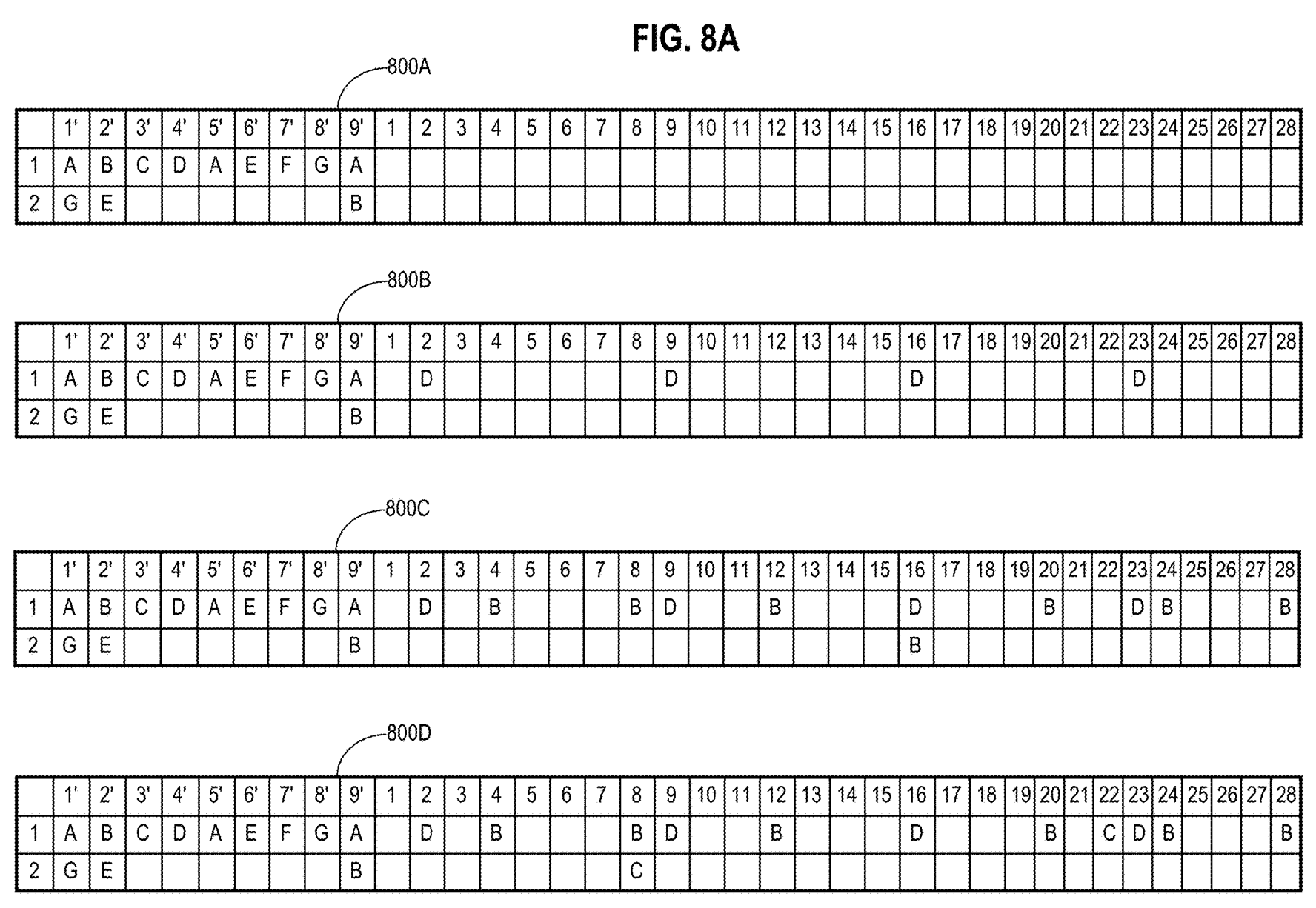
Figure 8B:
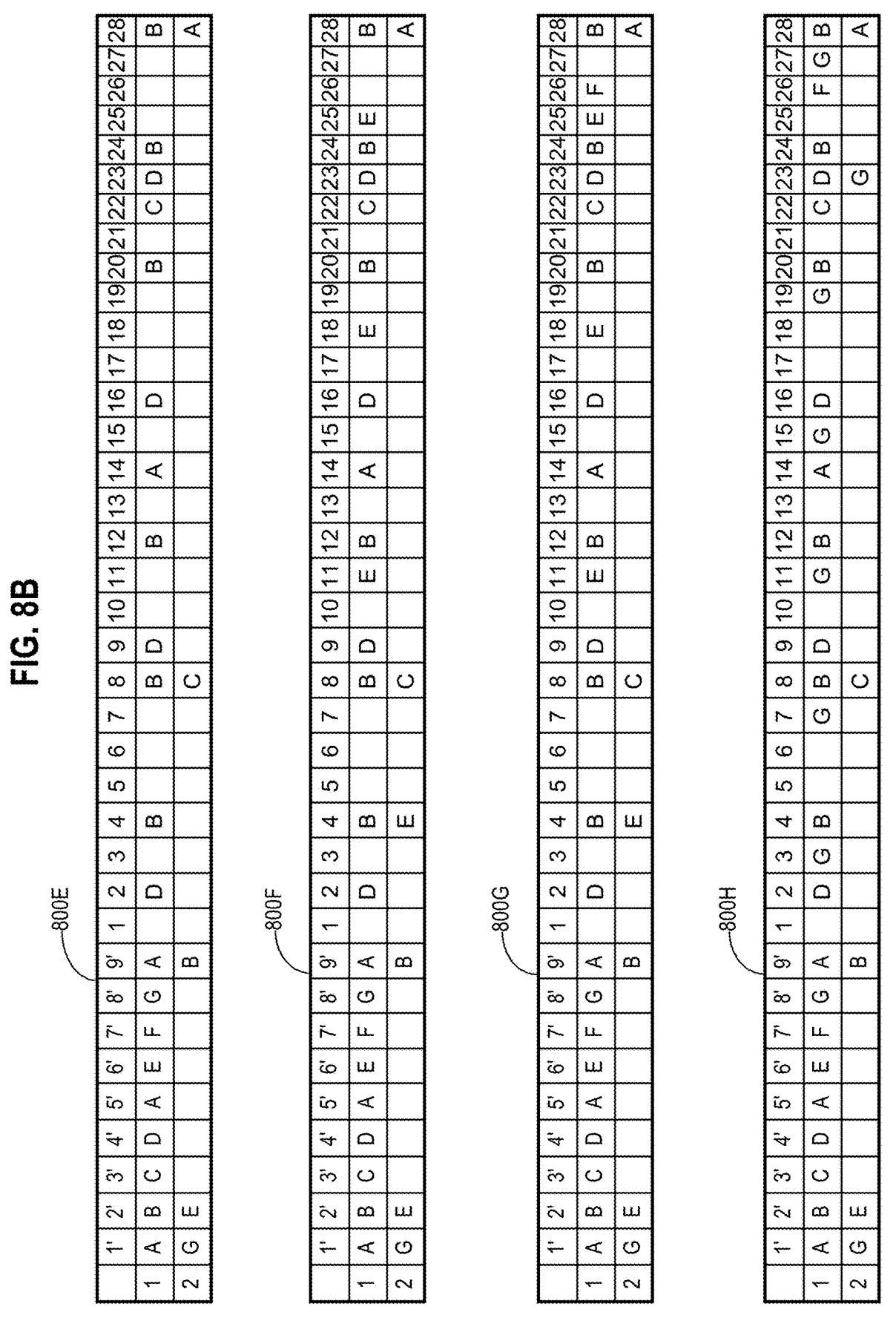

FIG. 8A and FIG. 8B illustrate an example operation of generating a schedule based on a resulting ordered arrangement. For one embodiment, FIG. 8A and FIG. 8B illustrate an example of scheduler 114 generating a schedule 800. More particularly, FIG. 8A and FIG. 8B provide an example of using tethered layering to generate schedule 800. In tethered layering, scheduler 114 generates a schedule by maintaining periodicity constraints relative to previously executed computation jobs. In the example of FIG. 8A and FIG. 8B, scheduler 114 initiates a new schedule 800A with an interval of previously executed computation jobs, such as with time segments 1'-8' of interval 500 of FIG. 5. The next time segment 9' of the schedule is presently being executed during the generation and evaluation of new schedules, and future time segments 1-28.

To generate a schedule, scheduler 114 utilizes a resulting ordered arrangement to map computation job types to computing resources for execution during one or more time segments. In FIG. 8A and FIG. 8B, scheduler 114 uses resulting ordered arrangement 604G of FIG. 6 to first schedule job type D, then in order B, C, A, E, F, and lastly G. New schedule 800B illustrates scheduler 114 adding job type D to time segments 1-28. As discussed above, the new periodicity constraints specify that job type D is performed four times a week, which when evenly spaced instructs that job type D should be scheduled for performance once every seven time segments. However, scheduler 114 does not schedule job type D in first time segment 1, because that would violate the periodicity constraint by executing D six time segments from the previous execution D at time segment 4'. Rather, scheduler 114 enforces the new periodicity constraint based on the last execution of the job type, and thus schedules the first instance of job type D in the new schedule for time segment 2 and computing resource 1. Thereafter, scheduler 114 schedules the next three executions of job type D evenly spaced from the execution of job type D at time segment 2, i.e., at time segments 9, 16, and 23, as shown in schedule 800B.

According to resulting ordered arrangement 604G, scheduler 114 next schedules job type B, which is performed seven times a week or once every four time segments. The last execution of job type B was at time segment 9', and scheduler 114 enforces the periodicity constraint by scheduling the next execution of job type D at time segment 4, then at time segments 8, 12, 16, 20, 24, and 28, as shown in schedule 800C. At time segment 16, job type D is already scheduled for execution by computing resource 1, so scheduler 114 schedules job type B at time segment 16 for execution by computing resource 2.

Scheduler 114 next schedules job type C, which is performed twice a week or once every fourteen time segments. The last execution of job type C was at time segment 3', and scheduler 114 enforces the periodicity constraint by scheduling the next execution of job type C at time segment 8, and next at time segment 22, as shown in schedule 800D. Scheduler 114 then schedules job type A, which is performed twice a week or once every fourteen time segments. The last execution of job type A was at time segment 9', and scheduler 114 enforces the periodicity constraint by scheduling the next execution of job type A at time segment 14, and next at time segment 28 by computing resource 2, as shown in schedule 800E. In like manner, scheduler 114 schedules, in order, job types E (schedule 800F), F (schedule 800G), and G (schedule 800H).

At block 220, scheduler 114 may further transform resulting schedule 800H for job types A-G, as appropriate to reduce the number of computing resources required, for instance. It being understood that in practice, a large number of computing resources beyond the two illustrated may be utilized.

Figure 9:
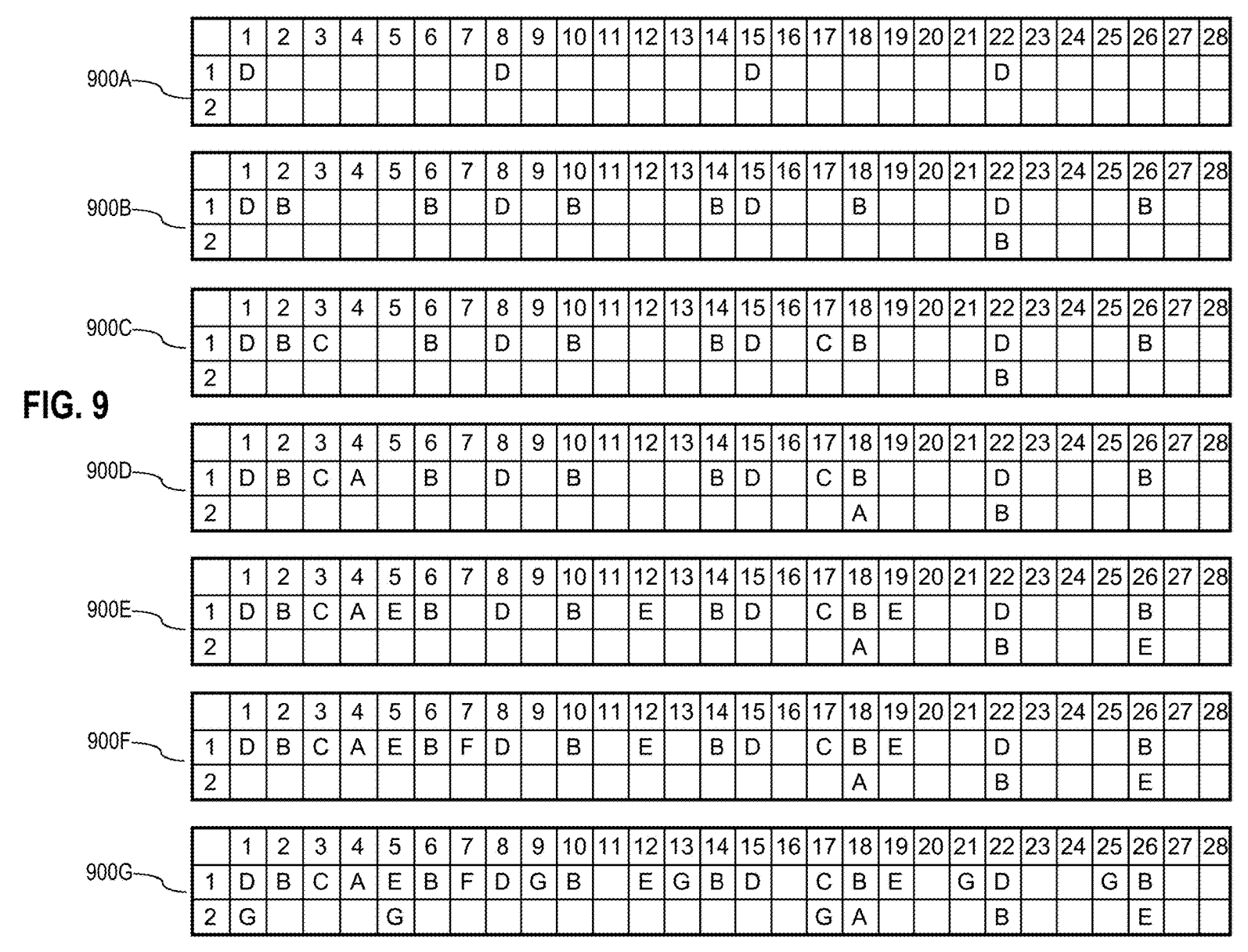

FIG. 9 illustrates another example operation of generating a schedule based on a resulting ordered arrangement. For one embodiment, FIG. 9 illustrates an example of scheduler 114 using untethered layering to generate a new schedule 900, which does not enforce periodicity constraints relative to previously executed computation jobs. Generally, at block 220, scheduler 114 can use tethered and/or untethered layering based on input or other requirements from the system or client. In the example of FIG. 9, scheduler 114 uses the resulting ordered arrangement 604G of FIG. 6 to first schedule job type D, then in order B, C, A, E, F, and lastly G. New schedule 900A illustrates scheduler 114 adding job type D to time segments 1-28. Since the scheduler 114 is using untethered layering, the scheduler 114 schedules the first instance of job type D in new schedule 900A at time segment 1 and computing resource 1. Thereafter, scheduler 114 schedules the next three executions of job type D evenly spaced from the execution of job type D at time segment 1, i.e., at time segments 8, 15, and 22, as shown in schedule 900A.

According to the resulting ordered arrangement 604G, scheduler 114 next schedules job type B, which is performed seven times a week or once every four time segments. Scheduler 114 schedules a first instance of job type B in the next available time segment for computing resource 1, i.e., segment 2, and schedules the remaining six instances of job type B at time segments 6, 10, 14, 18, 22, and 26, as shown in schedule 900B. At time segment 22, job type D is already scheduled for execution by computing resource 1, so scheduler 114 schedules job type B at time segment 22 for execution by computing resource 2.

Scheduler 114 next schedules job type C, which is performed twice a week or once every fourteen time segments. Scheduler 114 schedules a first instance of job type C in the next available time segment for computing resource 1, i.e., segment 3, and schedules the next instance at time segment 17, as shown in schedule 900C. Scheduler 114 then schedules job type A, which is performed twice a week or once every fourteen time segments. Scheduler 114 schedules a first execution of job type A at time segment 4, and next at time segment 18 by computing resource 2, as shown in schedule 900D. In like manner, scheduler 114 schedules, in order, job types E (schedule 900E), F (schedule 900F), and G (schedule 900G).

Referring more particularly to schedule 900G, job type G is performed seven times a week, and in order to schedule seven executions into time segments 1-28, scheduler 114 schedules a first execution of job type G at time segment 1 by computing resource 2, and following executions at time segment 5 by computing resource 2, time segments 9 and 13 by computing resource 1, time segment 17 by computing resource 17, and time segments 21 and 25 by computing resources 21 and 25.

At block 222, scheduler 114 evaluates a schedule produced at block 220 and selects, for implementation, a particular schedule from numerous schedule options based on computing resource efficiency and/or periodicity constraint violations, for example. According to one embodiment, scheduler 114 uses a function to evaluate the fitness of schedules, which takes the form $f(s, p)=1/(k*s+q*p)$. In this function, "s" corresponds to a number of computing resources utilized (e.g., the number of servers used to implement the schedule), and "k" is a coefficient that applies a weight based on characteristics of the utilized computing resources. Further, "p" corresponds to a number of periodicity violations in the schedule, and "q" is a coefficient that applies a weight based on characteristics of the periodicity constraints. Using this fitness function, a schedule with a lower score or value implies a lesser usage of computing resources with fewer periodicity constraint violations. Accordingly, as scheduler 114 uses the fitness function to calculate fitness scores for different schedules, the scheduler also ranks the schedules by the fitness scores and selects a schedule for implementation that has the best fitness score, or at least an acceptable fitness score that meets some predetermined threshold requirement.

Scheduler 114 proceeds to iteratively generate resulting ordered arrangements (blocks 214-218), generate schedules (block 22), and evaluate the schedules and update the selection of a schedule for implementation (block 222). Scheduler 114 can continue this process during the timing allowed to implement a new schedule, which was determined at block 212. At or near the conclusion of the determined timing, at block 224, scheduler 114 formalizes the selected schedule and instructs job executor 112 to execute the computation jobs in accordance with the selected schedule.

Schedule Portal

Figure 10:
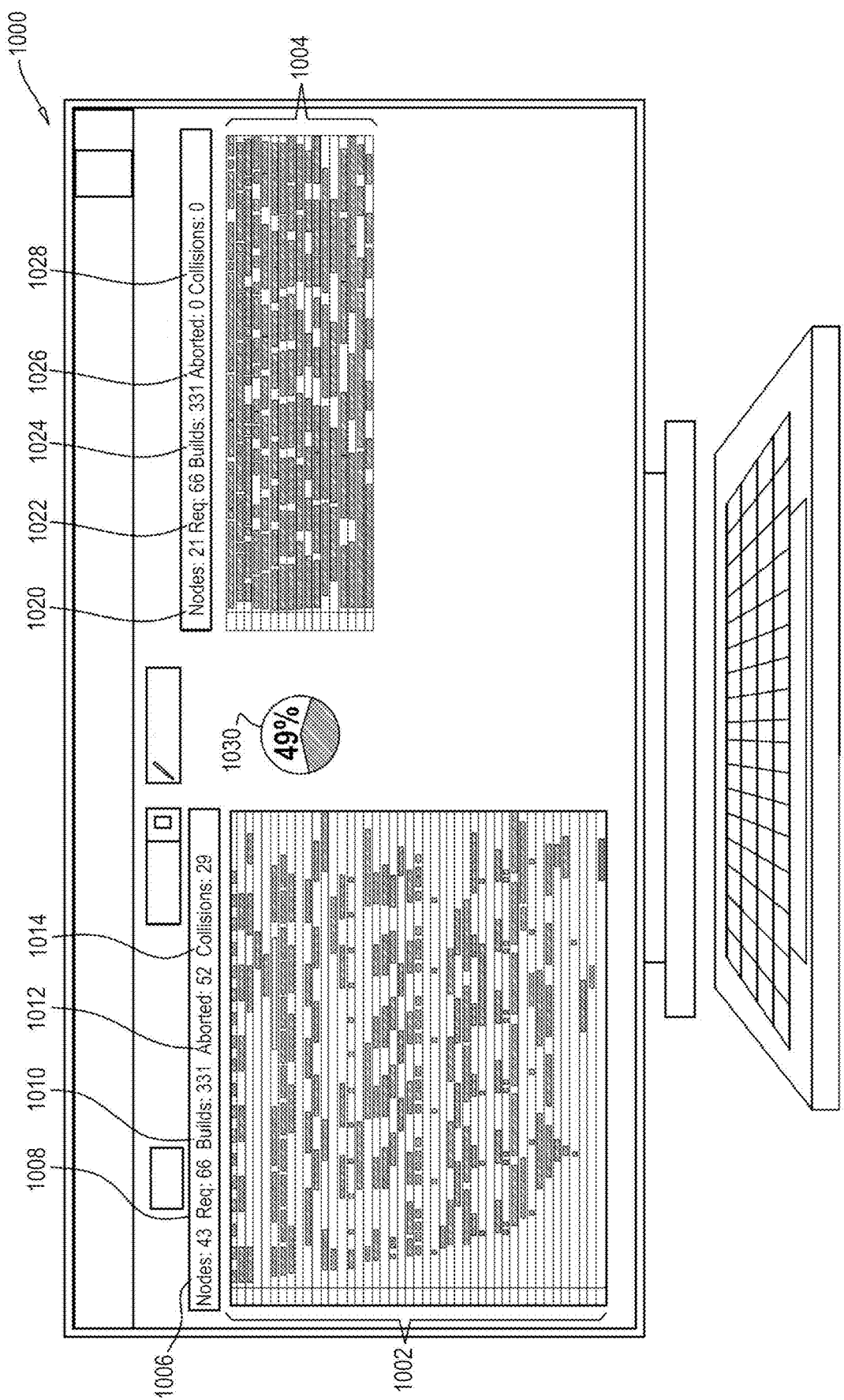
FIG. 10 is a diagrammatic view of a schedule portal user interface according to an embodiment.

FIG. 10 is a diagrammatic view of a schedule portal user interface according to an embodiment. FIG. 10 shows a schedule portal 1000, which provides an illustrative example of schedule portal 118 from system 100. As depicted in FIG. 10, schedule 1002 represent a non-optimized schedule for computation jobs running on a multiplicity of computing resources, whereas schedule 1004 represent an optimized schedule generated and selected by scheduler 114.

Node count 1006, request count 1008, build count 1010, aborted count 1012, and collision count 1014 represent actual statistics associated with the performance of computation jobs in schedule 1002. For example, as per request count 1008, sixty-six job requests have been received, and these job requests have been instantiated, as per build count 1010, in 331 builds that have been scheduled to be executed on forty-three cloud nodes (as per node count 1006). Aborted count 1012 may represent the number of jobs that were aborted (e.g., fifty-two jobs) for whatever reason, and collision count 1014 may represent the number of collisions between jobs that are competing for the same resources (e.g., twenty-nine collisions) that were observed in a most recent period of time (e.g., a day, a week, a month, etc.). It will be appreciated that in operation, the period of time for which the observations are made may be configurable.

Node count 1020, request count 1022, build count 1024, aborted count 1026, and collision count 1028 represent projected statistics associated with the performance of jobs in schedule 1004. Per the example, the values for request count 1022 and build count 1024 may be the same as request count 1008 and build count 1010, respectively, thereby reflecting the case that the number of job requests and resulting builds may be constant across schedules 1002 and 1004. However, node count 1020 is significantly lower than node count 1006 (e.g., 21 vs. 43) reflecting a significant drop in the number of computing resources allocated for the performance of the same number of computation jobs. As indicated in savings indicator 1030, schedule 1004 may entail the allocation of only 49% of the number of computing resources allocated for schedule 1002. Aborted count 1026 and collision count 1028 may represent a projection of zero aborted jobs and zero collisions for the jobs associated with schedule 1004.

In operation, schedule portal 1000 may be employed by a user representing the entity for which the relevant job requests have been submitted. The user may use schedule portal 1000 to present scheduling recommendations provided by scheduler 114, and to function as a control utility by providing a user interface for the user to accept or reject the scheduling recommendations. Alternatively, or in addition, schedule portal 1000 may be employed by an operator of the cloud service provider.

Implementation Example—Hardware Overview

According to one embodiment, the techniques described herein are implemented by at least one computer or computing device. The techniques may be implemented in whole or in part using a combination of at least one server computer and/or other computing devices that are coupled using a network, such as a cloud network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 11:
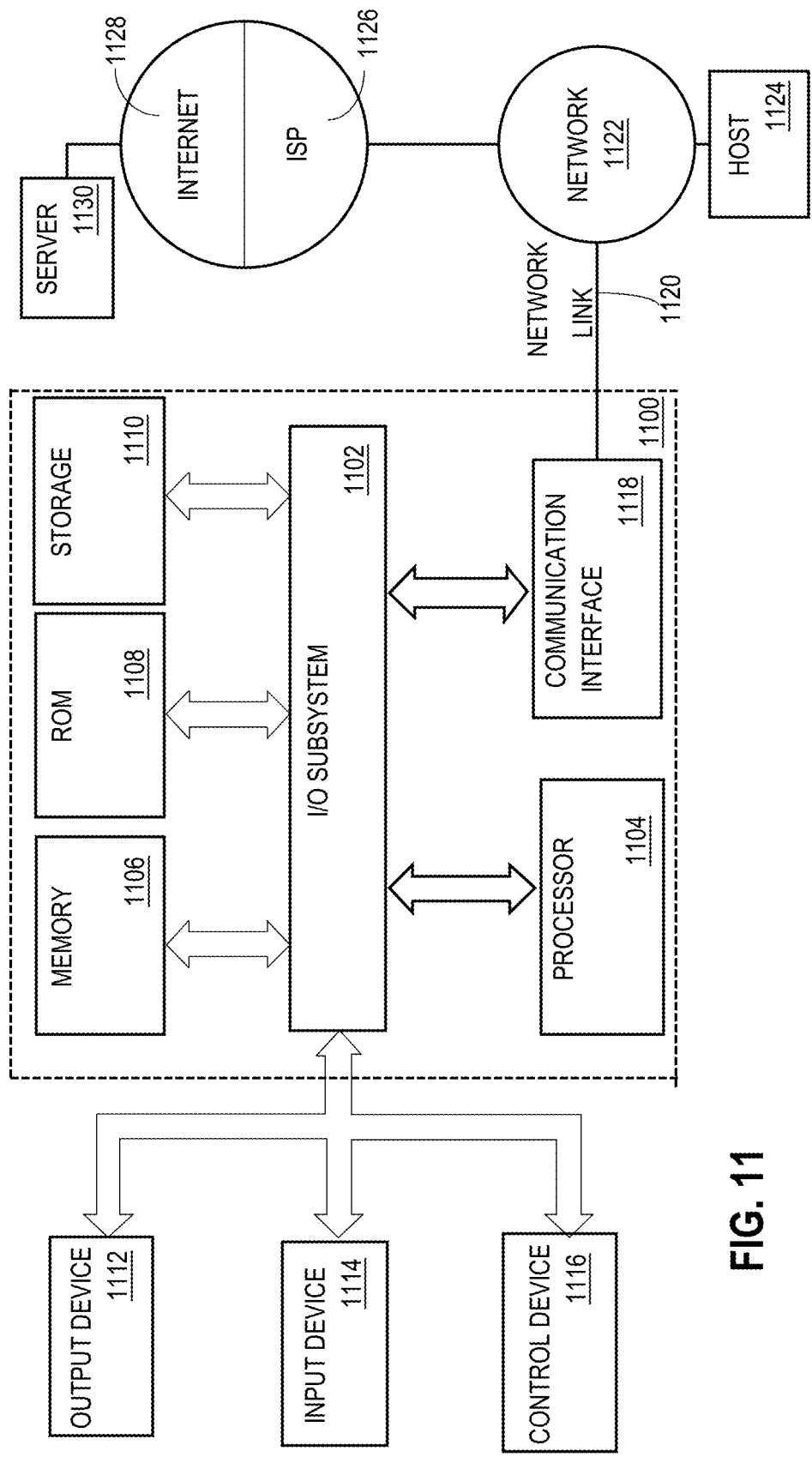
FIG. 11 is a block diagram that illustrates an example computer system that may be used to implement one or more embodiments.

FIG. 11 is a block diagram that illustrates an example computer system with which an embodiment may be implemented. In the example of FIG. 11, a computer system 1100 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1100 includes an input/output (I/O) subsystem 1102 which may include a bus and/or other communication mechanism(s) for communicating information and/or instructions between the components of the computer system 1100 over electronic signal paths. The I/O subsystem 1102 may include an I/O controller, a memory controller and at least one I/O port. The electronic signal paths are represented schematically in the drawings, for example as lines, unidirectional arrows, or bidirectional arrows.

At least one hardware processor 1104 is coupled to I/O subsystem 1102 for processing information and instructions. Hardware processor 1104 may include, for example, a general-purpose microprocessor or microcontroller and/or a special-purpose microprocessor such as an embedded system or a graphics processing unit (GPU) or a digital signal processor or ARM processor. Processor 1104 may comprise an integrated arithmetic logic unit (ALU) or may be coupled to a separate ALU.

Computer system 1100 includes one or more units of memory 1106, such as a main memory, which is coupled to I/O subsystem 1102 for electronically digitally storing data and instructions to be executed by processor 1104. Memory 1106 may include volatile memory such as various forms of random-access memory (RAM) or other dynamic storage device. Memory 1106 also may be used for storing temporary variables or other intermediate information during execution of instructions to be executed by processor 1104. Such instructions, when stored in non-transitory computer-readable storage media accessible to processor 1104, can render computer system 1100 into a special-purpose machine that is customized to perform the operations specified in the instructions.

Computer system 1100 further includes non-volatile memory such as read only memory (ROM) 1108 or other static storage device coupled to I/O subsystem 1102 for storing information and instructions for processor 1104. The ROM 1108 may include various forms of programmable ROM (PROM) such as erasable PROM (EPROM) or electrically erasable PROM (EEPROM). A unit of persistent storage 1110 may include various forms of non-volatile RAM (NVRAM), such as FLASH memory, or solid-state storage, magnetic disk or optical disk such as CD-ROM or DVD-ROM, and may be coupled to I/O subsystem 1102 for storing information and instructions. Storage 1110 is an example of a non-transitory computer-readable medium that may be used to store instructions and data which when executed by the processor 1104 cause performing computer-implemented methods to execute the techniques herein.

The instructions in memory 1106, ROM 1108 or storage 1110 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1100 may be coupled via I/O subsystem 1102 to at least one output device 1112. In one embodiment, output device 1112 is a digital computer display. Examples of a display that may be used in various embodiments include a touch screen display or a light-emitting diode (LED) display or a liquid crystal display (LCD) or an e-paper display. Computer system 1100 may include other type(s) of output devices 1112, alternatively or in addition to a display device. Examples of other output devices 1112 include printers, ticket printers, plotters, projectors, sound cards or video cards, speakers, buzzers or piezoelectric devices or other audible devices, lamps or LED or LCD indicators, haptic devices, actuators or servos.

At least one input device 1114 is coupled to I/O subsystem 1102 for communicating signals, data, command selections or gestures to processor 1104. Examples of input devices 1114 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1116, which may perform cursor control or other automated control functions such as navigation in a graphical interface on a display screen, alternatively or in addition to input functions. Control device 1116 may be a touchpad, a mouse, a trackball, or cursor direction keys for communicating direction information and command selections to processor 1104 and for controlling cursor movement on output device (e.g., display) 1112. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1114 may include a combination of multiple different input devices, such as a video camera and a depth sensor.

Computer system 1100 may implement the techniques described herein using customized hard-wired logic, at least one ASIC, GPU, or FPGA, firmware and/or program instructions or logic which when loaded and used or executed in combination with the computer system causes or programs the computer system to operate as a special-purpose machine. According to one embodiment, the techniques herein are performed by computer system 1100 in response to processor 1104 executing at least one sequence of at least one instruction contained in main memory 1106. Such instructions may be read into main memory 1106 from another storage medium, such as storage 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1110. Volatile media includes dynamic memory, such as memory 1106. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1102. Transmission media can also take the form of acoustic or light waves, such as those generated during radio-wave and infra-red data communications.

Various forms of media may be involved in carrying at least one sequence of at least one instruction to processor 1104 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1100 can receive the data on the communication link and convert the data to a format that can be read by computer system 1100. For instance, a receiver such as a radio frequency antenna or an infrared detector can receive the data carried in a wireless or optical signal and appropriate circuitry can provide the data to I/O subsystem 1102 such as place the data on a bus. I/O subsystem 1102 carries the data to memory 1106, from which processor 1104 retrieves and executes the instructions. The instructions received by memory 1106 may optionally be stored on storage 1110 either before or after execution by processor 1104.

Computer system 1100 also includes a communication interface 1118 coupled to bus 1102. Communication interface 1118 provides a two-way data communication coupling to network link(s) 1120 that are directly or indirectly connected to at least one communication networks, such as a network 1122 or a public or private cloud on the Internet. For example, communication interface 1118 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1122 broadly represents a local area network (LAN), wide-area network (WAN), campus network, internetwork or any combination thereof. Communication interface 1118 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1118 sends and receives electrical, electromagnetic or optical signals over signal paths that carry digital data streams representing various types of information.

Network link 1120 typically provides electrical, electromagnetic, or optical data communication directly or through at least one network to other data devices, using, for example, satellite, cellular, Wi-Fi, or BLUETOOTH technology. For example, network link 1120 may provide a connection through a network 1122 to a host computer 1124.

Furthermore, network link 1120 may provide a connection through network 1122 or to other computing devices via internetworking devices and/or computers that are operated by an Internet Service Provider (ISP) 1126. ISP 1126 provides data communication services through a world-wide packet data communication network represented as internet 1128. A server computer 1130 may be coupled to internet 1128. Server 1130 broadly represents any computer, data center, virtual machine or virtual computing instance with or without a hypervisor, or computer executing a containerized program system such as DOCKER or KUBERNETES. Server 1130 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1100 and server 1130 may form elements of a distributed computing system that includes other computers, a processing cluster, server farm or other organization of computers that cooperate to perform tasks or execute applications or services. Server 1130 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1130 may comprise a web application server that hosts a presentation layer, application layer and data storage layer such as a relational database system using structured query language (SQL) or no SQL, an object store, a graph database, a flat file system or other data storage.

Computer system 1100 can send messages and receive data and instructions, including program code, through the network(s), network link 1120 and communication interface 1118. In the Internet example, a server 1130 might transmit a requested code for an application program through Internet 1128, ISP 1126, local network 422 and communication interface 1118. The received code may be executed by processor 1104 as it is received, and/or stored in storage 1110, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1104. While each processor 1104 or core of the processor executes a single task at a time, computer system 1100 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A system, comprising:
   at least one processor; and
   memory storing instructions that, when executed by the at least one processor, cause the at least one processor to perform operations comprising:
      determining, based on a previous schedule of computing jobs, execution frequencies of the computing jobs;
      generating a schedule of the computing jobs by:
         selecting, for a first slot in the schedule, a first computing job having a highest execution frequency among the computing jobs; and
         selecting, for a second slot in the schedule, a second computing job having a highest priority among the computing jobs with respect to an other characteristic of the computing jobs; and
      cause at least one computing resource to execute the computing jobs based on the schedule.

2. The system of claim 1, wherein the other characteristic comprises execution durations of the computing jobs, computing resource utilization levels of the computing jobs, data utilization levels of the computing jobs, functions of the computing jobs, users associated with the computing jobs, or clients associated with the computing jobs.

3. The system of claim 1, wherein the generating the schedule of the computing jobs for the computing resource further comprises:
   based on selecting the second computing job having the highest priority among the computing jobs with respect to the other characteristic:
      selecting, for a third slot in the schedule, a third computing job having a highest execution frequency among a portion of the computing jobs, the portion of the computing jobs omitting the first computing job and the second computing job.

4. The system of claim 1, wherein the first computing job has a higher execution frequency than the second computing job.

5. The system of claim 1, wherein the first slot occurs before the second slot.

6. The system of claim 1, wherein the operations further comprise:
   determining that the at least one computing resource is operating with excess capacity.

7. The system of claim 1, wherein the operations further comprise:
   determining that one or more of the execution frequencies of the computing jobs have been modified, and
   wherein generating the schedule for the computing jobs is in response to determining that the one or more of the execution frequencies of the computing jobs have been modified.

8. The system of claim 1, wherein the operations further comprise:
   determining, based on the previous schedule of the computing jobs, the other characteristic.

9. A system, comprising:
   at least one processor; and
   memory storing instructions that, when executed by the at least one processor, cause the at least one processor to perform operations comprising:
      generating a first list of computing jobs and associated first priorities of the computing jobs with respect to execution frequencies of the computing jobs, the computing jobs and associated first priorities being ordered in the first list based on the first priorities;
      generating a second list of the computing jobs and associated second priorities of the computing jobs with respect to computing resource utilization levels of the computing jobs, data utilization levels of the computing jobs, functions of the computing jobs, users associated with the computing jobs, or clients associated with the computing jobs, the computing jobs and associated second priorities being ordered in the second list based on the first list;
      generating a schedule of the computing jobs by:
         selecting, for a first slot in the schedule, a first computing job with the associated first priority of the first computing job in the first list; and
         selecting, for a second slot in the schedule occurring after the first slot, a second computing job with the associated second priority of the second computing job in the second list; and
      causing a computing resource to execute the computing jobs based on the schedule.

10. The system of claim 9, wherein the generating the schedule of the computing jobs further comprises:
    based on selecting the second computing job with the associated second priority of the second computing job in the second list:
       determining that the second computing job is associated with a third priority in the first list;
       determining that a third computing job is associated with the second priority in the first list;
       associating the third computing job with the third priority in the first list; and
       selecting, for a third slot in the schedule occurring after the second slot, the third computing job with the associated third priority of the third computing job in the first list.

11. The system of claim 9, wherein the first list prioritizes the first computing job over the second computing job.

12. The system of claim 9, wherein the operations further comprise:
    determining that the execution frequencies, the computing resource utilization levels, the data utilization levels, the functions, the users, or the clients have been modified, and
    wherein generating the schedule for the computing jobs is in response to determining that the execution frequencies, the computing resource utilization levels, the data utilization levels, the functions, the users, or the clients have been modified.

13. A method, comprising:
    determining, based on a previous schedule of computing jobs, execution frequencies of the computing jobs;
    generating a schedule of the computing jobs by:
       selecting, for a first slot in the schedule, a first computing job having a highest execution frequency among the computing jobs; and
       selecting, for a second slot in the schedule, a second computing job having a highest priority among the computing jobs with respect to an other characteristic of the computing jobs; and
    cause at least one computing resource to execute the computing jobs based on the schedule.

14. The method of claim 13, wherein the other characteristic comprises execution durations of the computing jobs, computing resource utilization levels of the computing jobs, data utilization levels of the computing jobs, functions of the computing jobs, users associated with the computing jobs, or clients associated with the computing jobs.

15. The method of claim 13, wherein the generating the schedule of the computing jobs for the computing resource further comprises:
    based on selecting the second computing job having the highest priority among the computing jobs with respect to the other characteristic:
       selecting, for a third slot in the schedule, a third computing job having a highest execution frequency among a portion of the computing jobs, the portion of the computing jobs omitting the first computing job and the second computing job.

16. The method of claim 13, wherein the first computing job has a higher execution frequency than the second computing job.

17. The method of claim 13, wherein the first slot occurs before the second slot.

18. The method of claim 13, further comprising:
    determining that the at least one computing resource is operating with excess capacity.

19. The method of claim 13, further comprising:
determining that one or more of the execution frequencies of the computing jobs have been modified, and
wherein generating the schedule for the computing jobs is in response to determining that the one or more of the execution frequencies of the computing jobs have been modified.

20. The method of claim 13, further comprising
determining, based on the previous schedule of the computing jobs, the other characteristic.

* * * * *